(12) United States Patent
Fujioka et al.

(10) Patent No.: US 8,700,362 B2
(45) Date of Patent: Apr. 15, 2014

(54) WIND TURBINE ROTOR DESIGNING METHOD, WIND TURBINE ROTOR DESIGN SUPPORT DEVICE, WIND TURBINE ROTOR DESIGN SUPPORT PROGRAM AND WIND TURBINE ROTOR

(75) Inventors: Hideyasu Fujioka, Tokyo (JP); Akihiro Nakamura, Tokyo (JP); Takao Kuroiwa, Tokyo (JP); Yoshiyuki Hayashi, Tokyo (JP); Yoshihiko Hayashi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 178 days.

(21) Appl. No.: 12/956,746

(22) Filed: Nov. 30, 2010

(65) Prior Publication Data

US 2012/0051892 A1    Mar. 1, 2012

Related U.S. Application Data

(63) Continuation of application No. PCT/JP2010/064838, filed on Aug. 31, 2010.

(51) Int. Cl.
*G06F 17/50* (2006.01)
*G06F 7/60* (2006.01)
*G06G 7/48* (2006.01)

(52) U.S. Cl.
USPC .......................... 703/1; 703/2; 703/6; 703/7

(58) Field of Classification Search
USPC .......................................................... 703/1
See application file for complete search history.

(56) References Cited

U.S. PATENT DOCUMENTS

| 6,582,196 | B1 | 6/2003 | Andersen et al. |
| 6,923,622 | B1 * | 8/2005 | Dehlsen .......................... 416/87 |
| 6,972,498 | B2 * | 12/2005 | Jamieson et al. ............... 290/55 |

(Continued)

FOREIGN PATENT DOCUMENTS

| DE | 20 2006 013 519 U1 | 1/2007 |
| DE | 102006041383 A1 | 3/2008 |

(Continued)

OTHER PUBLICATIONS

Hansen et al. "Aeroelastic Instability Problems for Wind Turbines", Wind Energ. 2007; 10:551-577.*

(Continued)

*Primary Examiner* — Shambhavi Patel
(74) *Attorney, Agent, or Firm* — Benjamin J. Hauptman; Manabu Kanesaka (57) ABSTRACT

A designing method of a wind turbine rotor includes: providing operation environment data indicative of an operation environment of a wind turbine generator including the wind turbine rotor and design data of the wind turbine blade; calculating a position of a center of mass of the wind turbine blade in each position in a lengthwise direction of the wind turbine blade in the operation environment from the operation environment data and the design data; and calculating an evaluation value which is a value depending on an integral value obtained by integrating a product of the calculated position of the center of mass of the blade and a mass per unit length at each position in a lengthwise direction of the wind turbine blade from a blade root portion of the wind turbine blade to a blade tip end of the same.

8 Claims, 10 Drawing Sheets

(56) References Cited

U.S. PATENT DOCUMENTS

| | | |
|---|---|---|
| 8,231,347 B2 * | 7/2012 | Dawson et al. ............... 416/87 |
| 2003/0066934 A1 * | 4/2003 | Bolonkin ............... 244/153 R |
| 2003/0123973 A1 * | 7/2003 | Murakami ............... 415/4.1 |
| 2003/0223868 A1 * | 12/2003 | Dawson et al. ............... 416/1 |
| 2007/0046028 A1 * | 3/2007 | Gizara ............... 290/54 |
| 2008/0164698 A1 * | 7/2008 | Habets ............... 290/44 |
| 2009/0185905 A1 * | 7/2009 | Farb ............... 416/131 |
| 2009/0304513 A1 | 12/2009 | Jacobson et al. |
| 2010/0104444 A1 | 4/2010 | Garcia Addujar |
| 2010/0296913 A1 * | 11/2010 | Lee ............... 415/4.2 |
| 2011/0067353 A1 * | 3/2011 | Tadayon ............... 52/745.18 |
| 2011/0101692 A1 * | 5/2011 | Bilaniuk ............... 290/44 |
| 2011/0150649 A1 * | 6/2011 | White et al. ............... 416/61 |
| 2011/0243734 A1 * | 10/2011 | Schmaling et al. ............ 416/107 |

FOREIGN PATENT DOCUMENTS

| | | |
|---|---|---|
| JP | 2009-287564 A | 12/2009 |
| JP | 2009287564 A | 12/2009 |
| WO | 03029644 A1 | 4/2003 |

OTHER PUBLICATIONS

Muyeen et al. "Stability Augmentation of Grid-Connected Wind Farm", 2009.*

Jonkman et al. "Definition of a 5-MW Reference Wind Turbine for Offshore System Development", Feb. 2009.*

Lovitz, Don. "Parameter Sensitivities Affecting the Flutter Speed of a MW-Sized Blade", American Institute of Aeronautics and Astronautics, 2008.*

Bir et al. "Preliminary Structural Design of Composite Blades for Two- and Three-Blade Rotors", Sep. 2004.*

Hansen, M.H. "Nonlinear Effects of Inflow Turbulence on Wind Turbine Flutter Limits", American Institute of Aeronautics and Astronautics, 2008.*

Hansen, M.H. UdTU Assignment 4A+B—Case: DCAMM Ph.D. course "Wind Turbine Dynamics and Aeroelasticity", Nov. 2008.*

Van Hulle et al. "Verification of Design Loads for Small Wind Turbines", 1996.*

Martinez et al. "Aerial Wind Turbine ", Apr. 2009.*

Tan et al. "Research and Utilization of Windmill", 2010.*

Barlas et al. "Review of state of the art in smart rotor control research for wind turbines ", 2009 Elsevier Ltd.*

Bolonkin, Alexander. "Utilization of Wind Energy at High Altitude", 2007.*

Cowgill et al. "Wind Turbine Rotor Design", 2006.*

International Search Report of corresponding application No. PCT/JP2010/064838 mailed Nov. 22, 2010.

Office Action in corresponding Australian Application No.—2010249135 issued Sep. 18, 2012.

Notice of Grant in corresponding Japanese Patent Application No. 2010-546974 which was mailed on Jan. 17, 2013.

Australian Notice of Acceptance as issued in Application No. 2010249135, and mailed on May 8, 2013.

Notice of Allowance in corresponding Korean Application No. 2011-7012037 issued May 2, 2013.

* cited by examiner

WIND TURBINE ROTOR DESIGNING METHOD, WIND TURBINE ROTOR DESIGN SUPPORT DEVICE, WIND TURBINE ROTOR DESIGN SUPPORT PROGRAM AND WIND TURBINE ROTOR

CROSS-REFERENCE TO RELATED APPLICATION

This application is a continuation of International Application No. PCT/JP2010/064838, filed on Aug. 31, 2010.

BACKGROUND OF THE INVENTION

1. Field of the Invention

The present invention generally relates to a wind turbine rotor designing method, a wind turbine rotor design support apparatus and a wind turbine rotor, and in particular to a designing technique for avoiding a contact of a wind turbine blade used in a wind turbine generator with a tower and further reducing the pitch moment.

2. Description of the Related Art

One problem accompanied by extension of the diameter of the wind turbine rotor of an upwind type wind turbine generator, that is, large-scaling of the wind turbine blades is increase in the bending amount of the wind turbine blades due to the wind load. A wind turbine blade may contact the tower when the bending amount of the wind turbine blade is increased, and it is therefore necessary that the wind turbine generator is designed so as to avoid contact of wind turbine blades with the tower in consideration of the bending amount of the wind turbine blades.

Three techniques are known for avoiding contact of the wind turbine blades with the tower. A first technique is to previously incline the pitch axes of the wind turbine blades (axes about which the wind turbine blades rotate) toward the windward side (i.e., provision of the cone angle). A second technique is to previously bend the wind turbine blades toward the windward side (i.e., pre-bend). A third technique is to make blade root attachment planes have an inclination angle with respect to the pitch axes so that the wind turbine blades are diagonally attached with respect to the pitch axes (i.e., root cut). In any of these techniques, the tip ends of the wind turbine blades are kept away from the tower and the contact of the wind tower blades with the tower is effectively avoided. Such techniques are disclosed in, for example, U.S. Patent Publication No. 2009/0304513 A1, U.S. Pat. No. 6,582,196 B1, U.S. Patent Publication No. 2010/0104444 A1, and German Patent Application No. 10 2006 041 383 A1.

The mere use of these techniques does not, however, dissolve a problem that the pitch moment required for rotating a wind turbine blade about the pitch axis is increased when the wind turbine blade is large-sized and the imbalance of load exerting on the blade rotation bearing is increased. Rather, in some case, there is even a case that the imbalance of the load exerted on the blade rotation bearing is increased on the contrary. The increase in the pitch moment necessitates increase in the driving ability of the pitch control mechanism which is mounted on the rotor head, and this is not preferable in designing a wind turbine generator. If the pitch moment required for rotating the wind turbine blade about the pitch axis is reduced by the design of the wind turbine blades, however, such a problem would be avoided.

According to a study by the inventors, use of an optimum designing technique allows reducing the pitch moment required for rotating a wind turbine blade about the pitch axis. No reference is found in the known techniques mentioned above as to reduction of the pitch moment.

SUMMARY OF INVENTION

Therefore, an objective of the present invention is to provide a designing technique for reducing the pitch moment required for rotating a wind turbine blade about the pitch axis.

In an aspect of the present invention, there is provided a designing method of a wind turbine rotor that includes a rotor head, a bearing provided on the rotor head and a wind turbine blade attached to the bearing. The wind turbine rotor designing method includes: providing operation environment data indicative of an operation environment of a wind turbine generator including the wind turbine rotor and design data of the wind turbine blade; calculating a position of a center of mass of the wind turbine blade in each position in a lengthwise direction of the wind turbine blade in the operation environment from the operation environment data and the design data; and calculating an evaluation value which is a value depending on an integral value obtained by integrating a product of the calculated position of the center of mass of the blade and a mass per unit length at each position in a lengthwise direction of the wind turbine blade from a blade root portion of the wind turbine blade to a blade tip end of the same.

In one embodiment, the operation environment data preferably includes first data indicative of the rated wind speed of the wind turbine generator and second data indicative of the lowest temperature at which the wind turbine generator is allowed to be operated or the air density corresponding to the lowest temperature.

The evaluation value F may be calculated using Equation (1) as below:

$$F=\int_{z_0}^{z_1}x(z)m(z)dz, \qquad (1)$$

where, in Equation (1), the z-axis is defined as the direction along the center axis of the bearing, and the x-axis is defined as being perpendicular to the z-axis so that a plane including the x-axis and z-axis is perpendicular to the rotation plane of the wind turbine rotor; $x(z)$ is the position of the center of mass of the wind turbine blade in the x-axis direction in the operation environment; $m(z)$ is the mass per unit length of the wind turbine blade at the coordinate z on the x-axis; $z_0$ is the position of the blade root of the wind turbine blade on the z-axis; and $z_1$ is the position of the blade tip end on the z-axis.

In one embodiment, $x(z)$ is calculated using the following equation:

$$x(z)=\Delta x(z)-\Delta x_{PRE}(z)-z\sin\theta,$$

where $\Delta x(z)$ is the displacement of the center of mass of the blade in the x-axis direction due to a wind load, and the pre-bend amount $\Delta x_{PRE}(z)$ is the position at the coordinate z of the center of mass of the wind turbine blade in the x-axis direction with no load, and the root cut inclination angle $\theta$ is the angle between the extending direction of the wind turbine blade at said blade root portion and the center axis of said bearing.

In the wind turbine rotor designing method, it is preferable to revise the design data so as to further reduce the integral value.

In a case where the blade root portion of the wind turbine blade is in a cylindrical shape, the extending direction of the wind turbine blade at the blade root portion may be defined as a center line of the cylindrical shape.

In another aspect of the present invention, there is provided a design support apparatus of a wind turbine rotor which includes a rotor head, a bearing provided on the rotor head and a wind turbine blade attached to the bearing. The design support apparatus includes: a storage device for storing operation environment data indicative of an operation environment of a wind turbine generator including the wind turbine rotor; and a processing unit. The processing unit is programmed so as to calculate the position of the center of mass of the wind blade at each position in the lengthwise direction of the wind turbine blade in the operation environment from the operation environment data and the design data, and to calculate an evaluation value that depends on an integral value obtained by integrating a product of the calculated position of the center of mass of the blade and the mass per unit length at each position in the lengthwise direction of the wind turbine blade from the blade root of the wind turbine blade to the blade tip end of the same.

In still another aspect of the present invention, there is provided a design support program of a wind turbine rotor that includes a rotor head, a bearing provided on the rotor head and a wind turbine blade attached to the bearing. The design support program causes a computer to execute the following steps of: calculating the position of the center of mass of the wind turbine blade at each position in the lengthwise direction of the wind turbine blade in an operation environment based on operation environment data indicative of the operation environment of a wind turbine generator including the wind turbine rotor and design data of the wind turbine blade, wherein the operation environment data and the design data are prepared in a storage device; and calculating an evaluation value which depends on an integral value obtained by integrating a product of the calculated position of the center of mass of the blade and the mass per unit length at each position in the lengthwise direction of the wind turbine blade from the blade root of the wind turbine blade to a blade tip end of the same.

In still another aspect of the present invention, a wind turbine rotor includes a rotor head, a bearing provided on the rotor head and a wind turbine blade attached to the bearing. For a case where a first direction is defined as the direction along the center axis of the bearing and a second direction is defined as being perpendicular to the first direction so that a plane defined by the first and second directions is perpendicular to a rotation plane of the wind turbine rotor, the wind turbine blade is so formed as to have such a shape that, for a tangent line at an agreement position at which a center of mass of the wind turbine blade meets the center axis of the bearing other than the blade root of the wind turbine blade to a curve of a change of the displacement in the second direction of the center of mass due to a wind load with respect to the distance from the blade root in the first direction in a case where the temperature is the lowest temperature at which a wind turbine generator provided with the wind turbine rotor is allowed to be operated and a wind blows at the rated wind speed, a portion of the curve away from the agreement position is located between the tangent line and the center axis of the bearing.

The present invention provides a designing technique for reducing the pitch moment required for rotating the wind turbine blade about the pitch axis.

DESCRIPTION OF PREFERRED EMBODIMENTS

Figure 1:
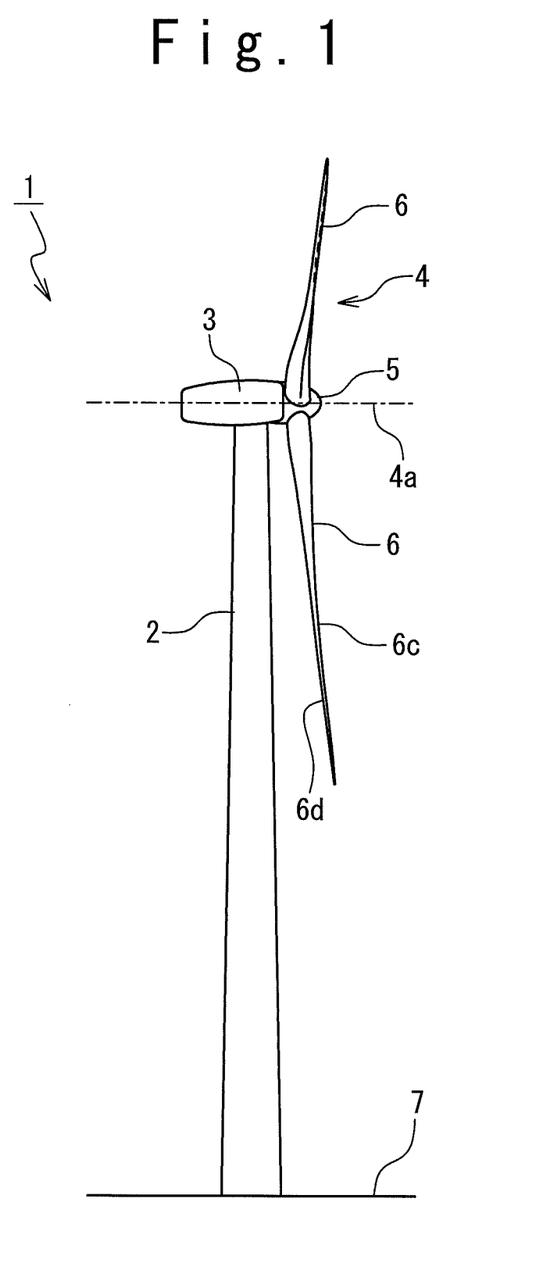
FIG. 1 is a side view showing the configuration of a wind turbine generator in one embodiment.

FIG. 1 is a side view showing the configuration of an upwind type wind turbine generator in one embodiment. The wind turbine generator 1 is provided with a tower 2 stood on a foundation 7, a nacelle 3 installed on a top end of the tower 2, and a wind turbine rotor 4. The wind turbine rotor 4 includes a rotor head 5 rotatably attached to the nacelle 3, and three wind turbine blades 6 attached to the rotor head 5. The rotation axis of the wind turbine rotor 4 (wind turbine rotation axis 4a) is directed in the horizontal direction or slightly upward than the horizontal direction in the windward direction. When the wind turbine rotor 4 is rotated by wind power, the wind turbine generator 1 generates electric power and supplies the power to the utility grid connected with the wind turbine generator 1.

Figure 2:
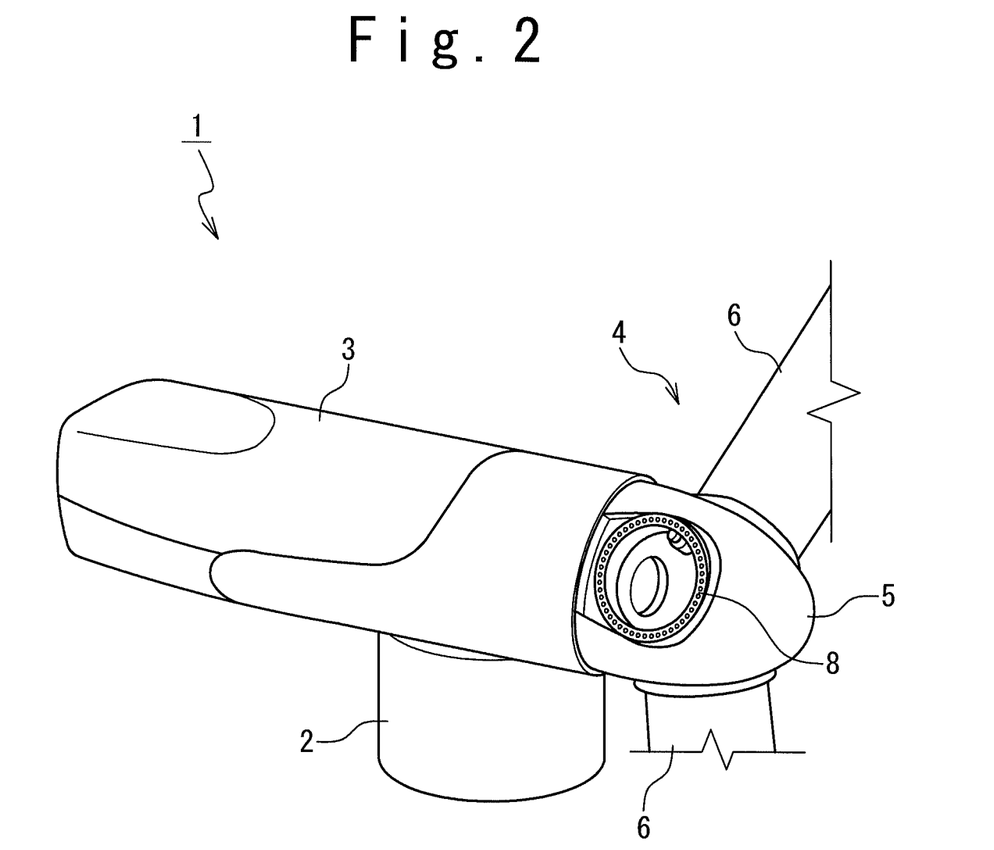
FIG. 2 is a perspective view showing an example of a connection structure between a rotor head and a wind turbine blade in one embodiment.

FIG. 2 is a perspective view showing a connection structure of the rotor head 5 and the wind turbine blades 6. Three bearings 8 (only one shown) are attached to the rotor head 5. The bearings 8 rotatably support the wind turbine blades 6, and the center axes of the bearings 8 corresponds to the rotation axes of the wind turbine blades 6, that is, the pitch axes. The pitch angle of the wind turbine blades 6 is variable by the bearing 8.

Figure 3A:
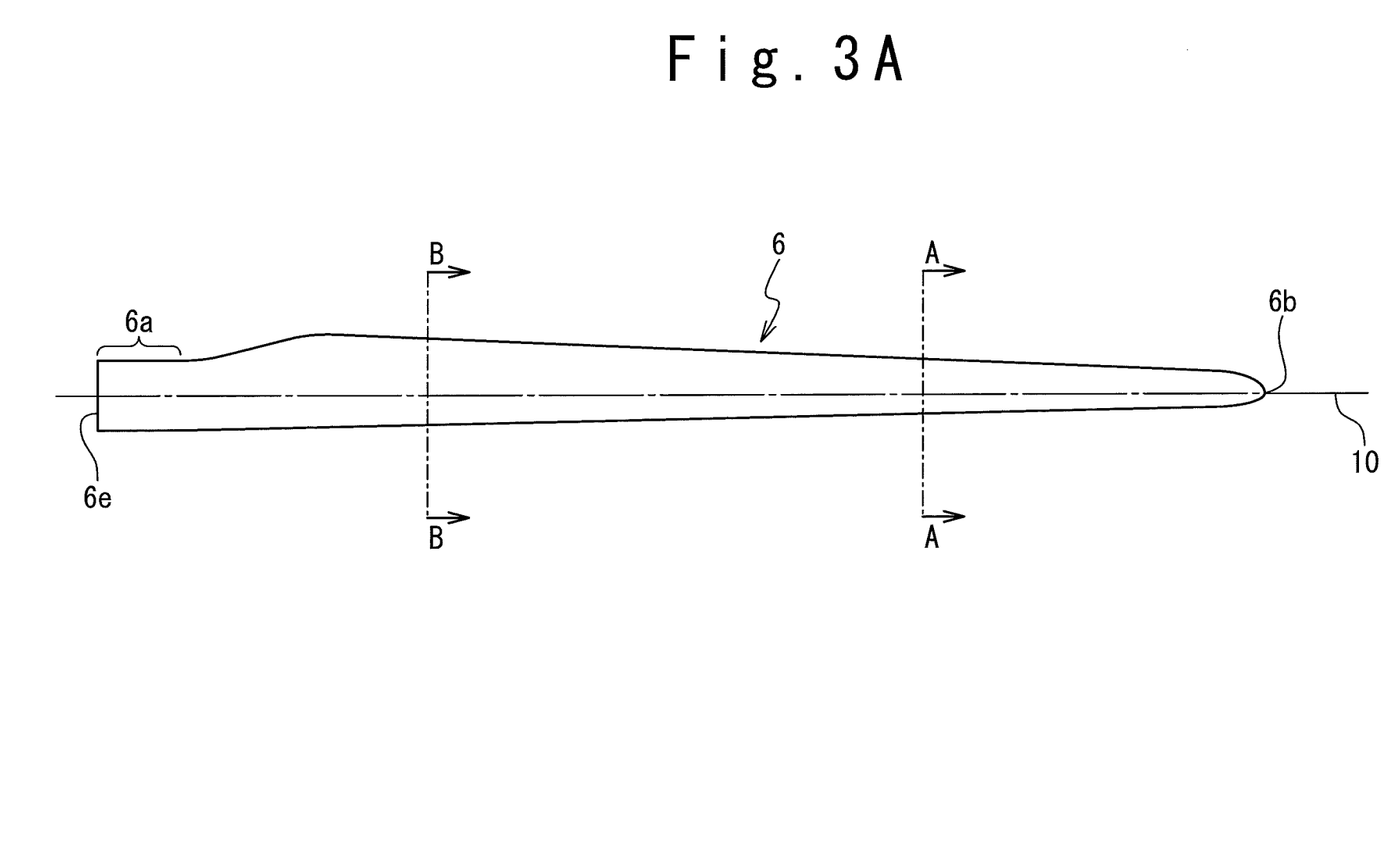
FIG. 3A is a plan view showing an example of the shape of the blade surface of the wind turbine blade.
Figure 3B:
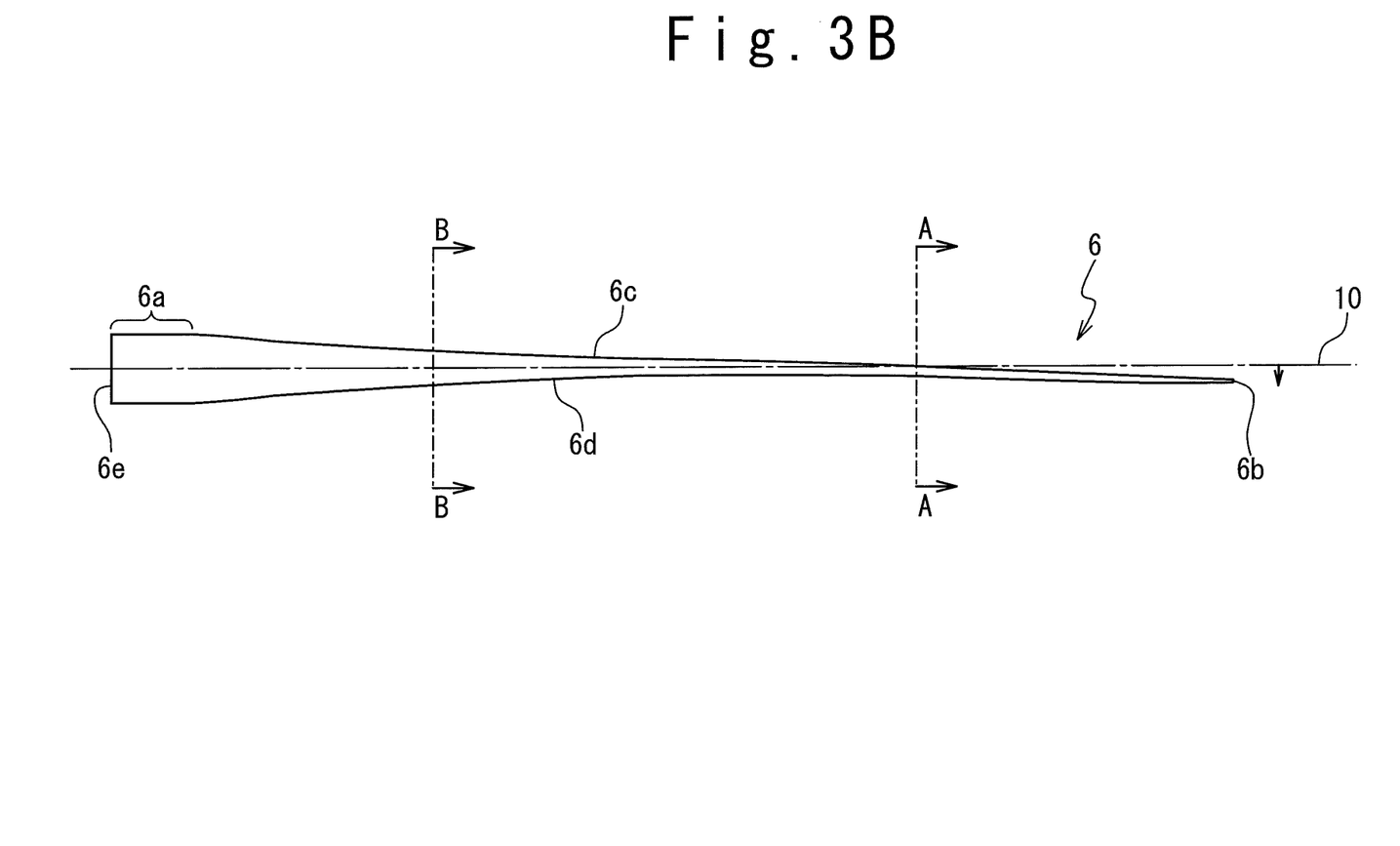
FIG. 3B is a front view showing the structure of the wind turbine blade viewed from the blade chord direction.

FIGS. 3A and 3B are diagrams showing an example of the structure of the wind turbine blades 6. FIG. 3A shows the configuration of the blade surface of a wind turbine blade 6, and FIG. 3B shows the structure of the wind turbine blade 6 viewed from the blade chord direction. In this embodiment, while the blade root portion 6a of the wind turbine blade 6 is formed in a cylindrical shape, a blade shape is formed in the middle portion and tip portion of the wind turbine blade 6. The blade-shaped portion and the blade root portion 6a are smoothly joined. In addition, in this embodiment, out of the blade surfaces of the wind turbine blade 6, the blade surface 6c on the windward side is formed to be concave and the blade surface 6d on the leeward side is formed to be convex, so that the tip end portion of the wind turbine blade 6 is curved in the windward direction. This aims to avoid contact between the wind turbine blade 6 and the tower 2. In FIGS. 3A and 3B, the center line (and the extension line) of the wind turbine blade 6 in the blade root portion 6a is denoted by numeral 10. As shown in FIG. 3B, the blade tip end 6b of the wind turbine blade 6 is offset in the windward direction with respect to the center line 10. Also, in FIGS. 3A and 3B, the blade root of the wind turbine blade 6 is denoted by numeral 6e.

Figure 4:
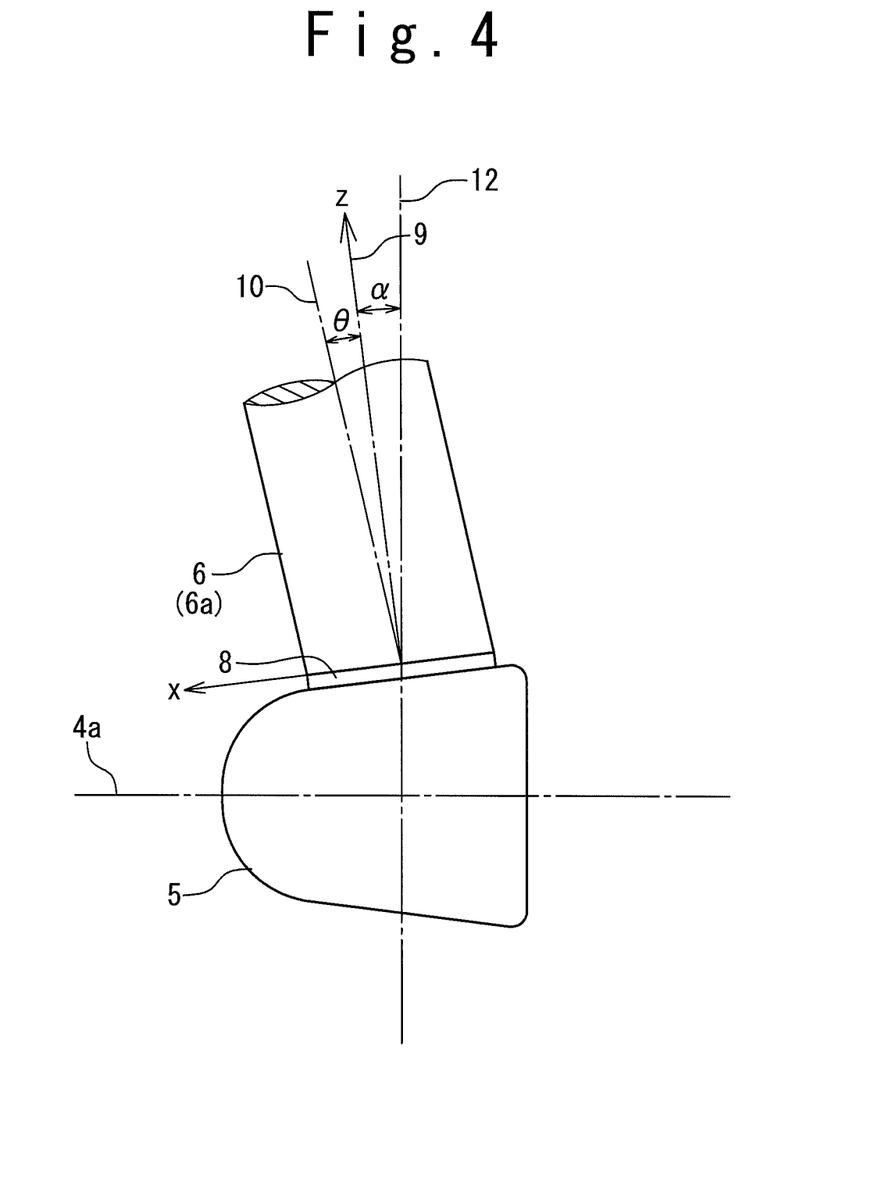
FIG. 4 is a side view showing the relationship between the central axis of a bearing of a wind turbine rotor and a center line of the blade root portion of the wind turbine blade.

FIG. 4 is a side view showing the relationship between the center axis (i.e., the pitch axis) of a bearing 8 and the center line 10 of the blade root portion 6a. The pitch axis is denoted by numeral 9 in FIG. 4. The terms used in the following description are defined as below referring to FIG. 4:

(1) Wind Turbine Rotation Plane

The wind turbine rotation plane 12 is a flat plane perpendicular to the wind turbine rotation axis 4a.

(2) Cone Angle

The cone angle $\alpha$ is an angle defined between the pitch axis 9 and the wind turbine rotation plane 12. More strictly, the cone angle $\alpha$ is an angle defined between a straight line and the pitch axis 9, wherein the straight line is defined by a plane which includes the pitch axis 9 and is perpendicular to the wind turbine rotation plane 12 and by the wind turbine rotation plane 12.

(3) Root Cut Inclination Angle

The root cut inclination angle $\theta$ is an angle defined between the extending direction of the wind turbine 6 in the blade root portion 6a and the pitch axis 9. Here, in this embodiment, since the blade root portion 6a is formed in a cylindrical shape, the root cut inclination angle $\theta$ is defined as an angle formed between the center line of the cylindrical shape of the blade root portion 6a and the pitch axis 9. In this embodiment, a non-zero root cut inclination angle $\theta$ is given by cutting off the cylindrical blade root portion 6a at a bevel.

Herein, the z-axis direction is defined as the direction along the pitch axis 9. It should be noted that z=0 at the blade root 6e of the wind turbine blade 6. In addition, the x-axis direction is defined as a direction perpendicular to the z-axis direction in the windward direction. Here, the x-axis direction is determined so that a plane defined by the x-axis and the z-axis is perpendicular to the wind turbine rotation plane 12.

As described above, there are known three techniques for avoiding that a wind turbine blade 6 contacts the tower 2:

A first technique is to incline the pitch axis of the wind turbine 6 (the rotation center axis of the wind turbine 6) toward the windward side. This means that the cone angle $\alpha$ mentioned above is set non-zero. This technique is referred to as "non-zero cone angle", hereinafter.

A second technique is to bend the tip portion of the wind turbine 6 toward the windward side in the manufacture. This technique is referred to as "pre-bend", hereinafter.

A third technique is to cut the blade root portion 6a of the wind turbine blade 6 at a bevel so as to diagonally attach the wind turbine blade 6 with respect to the pitch axis 9. This means that the root cut inclination angle $\theta$ mentioned above is set non-zero. This technique is referred to as "root cut", hereinafter.

These techniques are all effective for avoiding a contact of the wind turbine blade 6 with the tower 2. Although the easiest and most widely used technique is "non-zero cone angle", only the use of the "non-zero cone angle" cannot avoid the contact of the wind turbine blade 6 with the tower 2 for a large-size wind turbine blade 6. According to study by the inventor, it is therefore preferable to combine another technique with the "non-zero cone angle".

Herein, one idea of the inventor is that the "non-zero cone angle", "pre-bend" and "root cut" have respectively different influences on the pitch moment Mzb (the moment required for rotating the wind turbine blade 6 about the pitch axis 9) and that the pitch moment Mzb can be reduced by appropriately combining these techniques. The following discusses the influences on the pitch moment Mzb caused by the "non-zero cone angle", "pre-bend" and "root cut".

When only the "non-zero cone angle" is used, the wind turbine blade 6 is positioned on the pitch axis 9 at no load. Accordingly, the use of only the "non-zero cone angle" results in that the tip portion of the wind turbine blade 6 is moved away from the pitch axis 9 to thereby increase the pitch moment Mzb, when the wind turbine blade 6 is bent by the wind load.

On the other hand, the use of the "pre-bend" reduces the pitch moment Mzb, since the tip portion of the wind turbine blade 6 can be brought close to the pitch axis 9 when the wind turbine blade 6 is bent by the wind load.

Here, according to the study by the inventors, it is the "root cut" that is most effective for reducing the pitch moment Mzb. In the following, a description is given of the effect of reduction of the pitch moment Mzb by the "root cut", referring to FIGS. 5 to 9.

Figure 5:
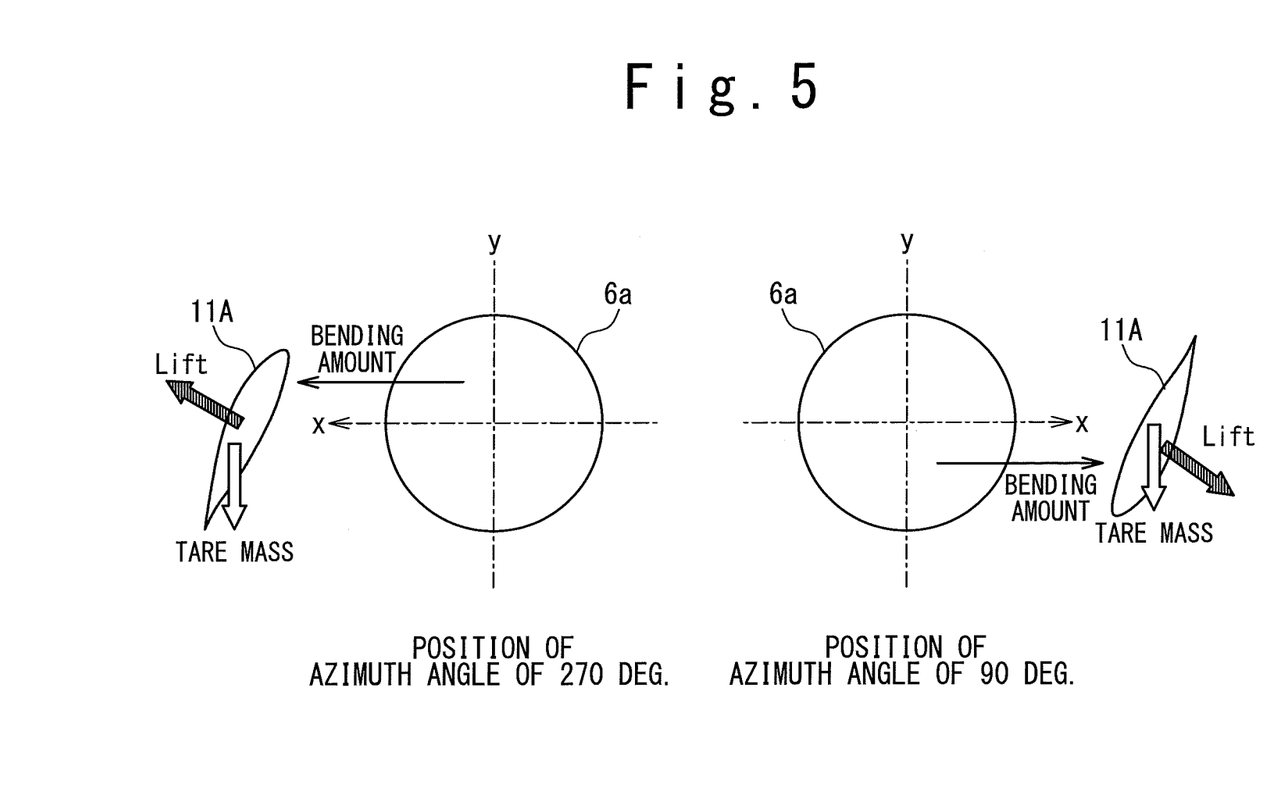
FIG. 5 is a diagram showing the positional relationship between the blade root portion of the wind turbine blade and the blade section in the A-A section in a case in which "root cut" is not adopted.

FIG. 5 shows the relationship between the blade root portion 6a of the wind turbine blade 6 and a blade section 11A in a case when the "root cut" is not adopted. Herein, the left figure of FIG. 5 shows the positional relationship between the blade root portion 6a of the wind turbine blade 6 and the blade section 11A in the case where the wind turbine blade 6 is located at an azimuth angle of 270° and the right figure of FIG. 5 shows the positional relationship between the blade root portion 6a of the wind turbine blade 6 and the blade section 11A in the case where the wind turbine blade 6 is located at an azimuth angle of 90°. It should be noted here that the "azimuth angle" means the position of the wind turbine blade 6 in the circumferential direction of the wind turbine rotation axis 4a and the azimuth angle is defined to be 0° in the case where the wind turbine blade 6 is located in the vertical upward direction or in the direction closest thereto. The blade section 11A is within the A-A section in FIGS. 3A and 3B, that is, the blade section of the wind turbine blade 6 at a position slightly closer to the blade tip end 6b from the midpoint of the wind turbine blade 6.

Figure 6:
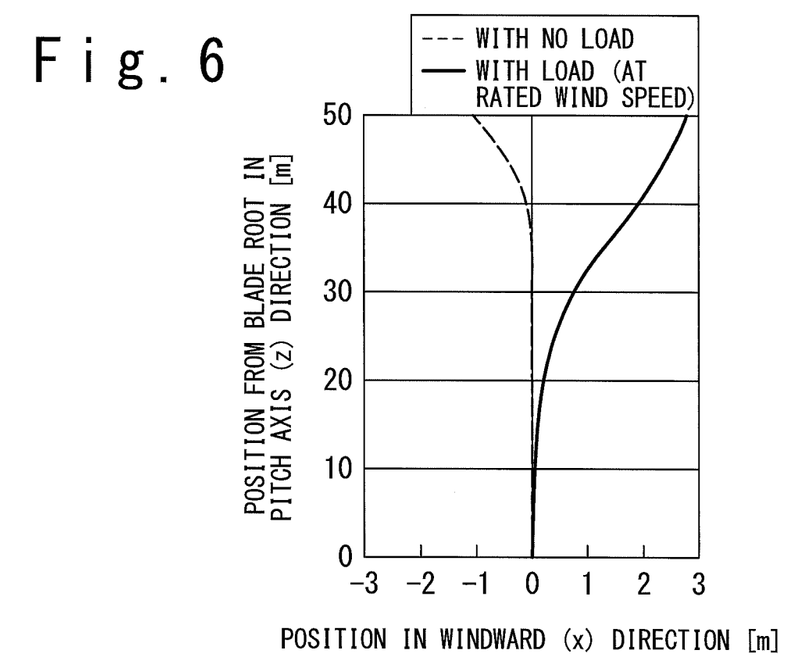
FIG. 6 is a graph showing a change of a position of a center of mass of a blade in the windward direction (x-axis direction) with respect to the position in the pitch axis direction (z-axis direction) from the blade root portion in a case when "pre-bend" is adopted without adopting "root cut"

As shown in FIG. 5, when a wind load is applied, the wind turbine blade 6 is bent and the blade section 11A is moved away from the pitch axis 9. The bearing 8 for rotating the wind turbine blade 6 is applied with an asymmetric load by the self weight and the aerodynamic force in proportion to the bending amount of the wind turbine blade 6 so that the pitch moment Mzb is increased. FIG. 6 is a graph showing a change in the position x(z) of the center of mass of the blade in the windward direction (x-axis direction) with respect to the coordinate z in the pitch axis direction (z-axis direction) from the blade root 6e in a case when the "pre-bend" is used without using the "root cut". It should be noted here that the position x(z) of the center of mass of the blade in the coordinate z in the pitch axis direction means the position of the center of mass the blade calculated for the blade section perpendicular to the pitch axis 9 passing through the coordinate z. With no load, the center of bass of the blade is located in proximity to the pitch axis 9 as a whole, although the bent tip portion of the wind turbine blade 6 is located slightly away from the pitch axis 9 in the windward direction. When a wind load corresponding to the rated wind speed is applied, the wind turbine blade 6 is bent toward the leeward side, and the center of mass of the blade is moved farther away from the pitch axis 9 as the position is approached nearer to the blade tip end 6b of the wind turbine blade 6. Thus, the asymmetricity of the load applied to the bearing 8 which rotates the wind turbine blade 6 is increased so as to increase the pitch moment Mzb required for rotating the wind turbine blade 6 about the pitch axis 9.

Figure 7:
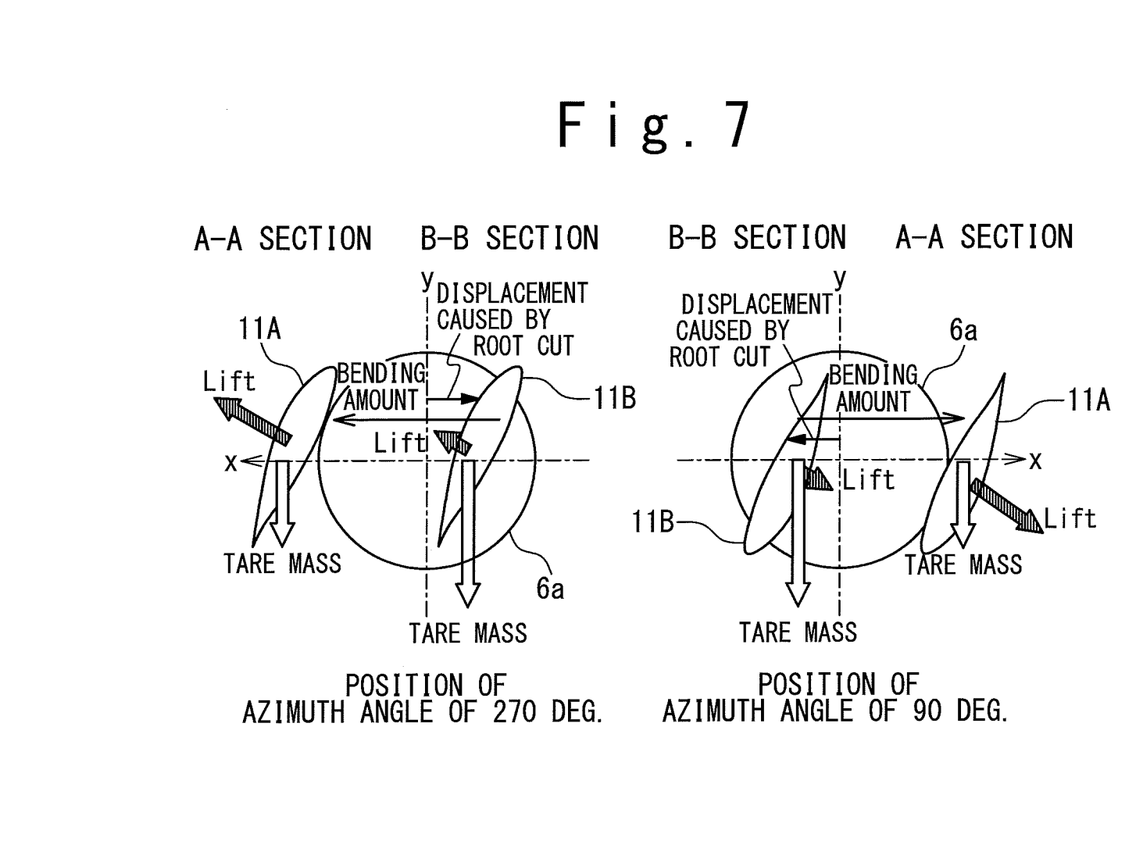
FIG. 7 is a diagram showing positional relationships between the blade root portion of the wind turbine blade and the blade section in the A-A and B-B sections in a case when "root cut" is adopted.

On the other hand, FIG. 7 shows positional relationships between the blade root portion 6a of the wind turbine blade 6 and the blade sections 11A and 11B in a case when the "root cut" is used. The left figure of FIG. 7 shows the positional relationship between the blade root portion 6a of the wind turbine blade 6 and the blade sections 11A and 11B in the case where the wind turbine blade 6 is located at an azimuth angle of 270° and the right figure of FIG. 7 shows the positional relationship between the blade root portion 6a of the wind turbine blade 6 and the blade sections 11A and 11B in the case where the wind turbine blade 6 is located at an azimuth angle of 90°. It should be noted here that the blade section 11B is within the B-B section in FIGS. 3A and 3B, that is, the blade section of the wind turbine blade 6 at a position slightly closer to the blade root 6e from the midpoint of the wind turbine blade 6. That is, the blade section 11A is located relatively away from the blade tip end 6b of the wind turbine blade 6 and the blade section 11B is located relatively close to the blade root portion 6a of the wind turbine blade 6.

Figure 8:
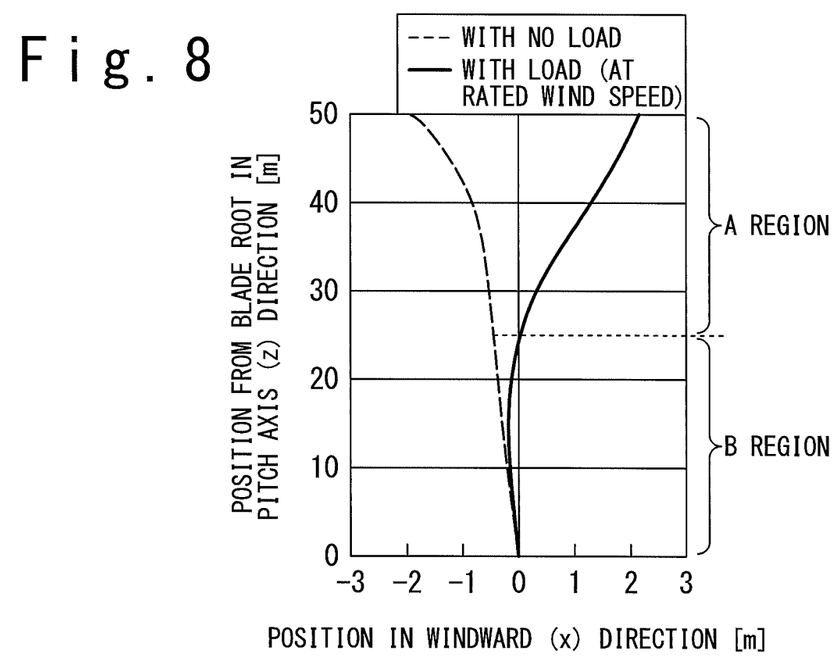
FIG. 8 is a graph showing a change of the position of the center of mass of a blade in the windward direction (x-axis direction) with respect to the position in the pitch axis direction (z-axis direction) from the blade root in a case when "pre-bend" and "root cut" are adopted.

One feature of the wind turbine blade 6 adopting the "root cut" is that, in a case where the wind turbine blade 6 is bent by a wind load, the portion close to the blade root portion 6a of the wind turbine blade 6 is located on the windward side with respect to the pitch axis 9 while the portion close to the blade tip end 6b is located on the leeward side with respect to the pitch axis 9. This is shown by the fact that the blade sections 11A and 11B are located in opposite sides across the pitch axis 9 in any of the cases of an azimuth angle 270° or 90° in FIG. 7. Also, as shown in FIG. 8, the center of mass of the blade is located on the windward side with respect to the pitch axis 9 in a region B, and the center of mass of the blade is located on the leeward side with respect to the pitch axis 9 in a region A. Thus, the pitch moments Mzb due to the self weight of the portion close to the blade root portion 6a and the self weight of the portion close to the blade tip end 6b of the wind turbine blade 6 are cancelled to each other so that the pitch moment Mzb required for rotating the wind turbine blade 6 about the pitch axis 9 is reduced.

When the wind turbine rotor 4 is so designed as to reduce the pitch moment Mzb, it is necessary to pay attention to the fact that the pitch moment Mzb depends on the operation environment of the wind turbine generator 1. The pitch moment Mzb is maximized, when the temperature is the lowest temperature at which the wind turbine generator 1 is allowed to be operated and the wind turbine generator 1 is operated in the operation environment in which the wind blows at the rated wind speed. That is, the temperature is related to the air density, which becomes maximum when the temperature is the lowest temperature. When the actual wind speed is smaller than the rated wind speed, the wind turbine generator 1 is so controlled as to be placed in the fine state where the pitch angle of the wind turbine blades 6 is minimum (i.e., the state in which the received wind power energy is maximum) or to be a pitch angle approximate thereto, and when the effective wind speed exceeds the rated wind speed, the pitch angle is increased as the wind speed is increased so as to be in a state close to the feather state (i.e., the state in which the received wind power energy is minimum). When such operation is implemented, the pitch moment Mzb is maximum when the actual wind speed is the rated wind speed. As a result, since the pitch moment Mzb becomes maximum when the temperature is the lowest temperature at which the wind turbine generator 1 is allowed to be operated and the wind blows at the rated wind speed, it is preferable to design the wind turbine rotor 4 so that the pitch moment Mzb is reduced in this case.

Figure 9:
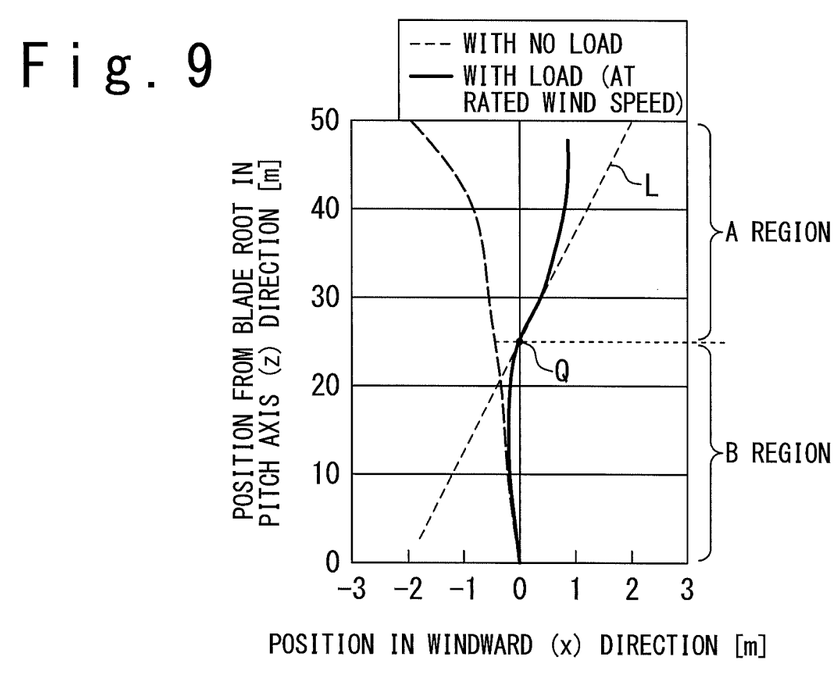
FIG. 9 is a graph showing a change of the position of the center of mass of the blade in the windward direction (x-axis direction) with respect to the position in the pitch axis direction (z-axis direction) from the blade root.

In a preferred example of a design of the wind turbine rotor 4, a curve of the change in the position $x(z)$ of the center of mass of the wind turbine blade 6 in the windward direction with respect to the coordinate z in the pitch axis direction (z-axis direction) from the blade root 6e satisfies the following requirement, under conditions in which the pitch moment Mzb becomes maximum (i.e., when the temperature is the lowest temperature at which the wind turbine generator 1 is allowed to be operated and the wind blows at the rated wind speed) (see FIG. 9):

Requirement:

For a tangent line L drawn at a position Q at which the position $x(z)$ of the center of mass of the blade meets the pitch axis 9 other than the blade root 6e, the portion of the curve away from the position Q is located between the tangent line L and the pitch axis 9 (the z-axis).

The design of the wind turbine blade 6 satisfying such a requirement, the balance is improved between the portion located on the windward side with respect to than the pitch axis 9 and the portion located on the leeward side with respect to than the pitch axis 9 when the wind turbine blade 6 is bent, and thereby the pitch moment Mzb is reduced.

It should be noted that it is important to adopt the "root cut" in terms of the reduction of only the pitch moment Mzb and it is not always necessary to adopt the "non-zero cone angle" and "pre-bend". On the other hand, it is effective to adopt the "non-zero cone angle" and/or "pre-bend" in view of avoiding the contact between the wind turbine blade 6 and the tower 2. Accordingly, it is appropriate to adopt the "root cut" in addition to the "non-zero cone angle" and/or "pre-bend", as a whole of the actual wind turbine rotor 4.

Here, when the "root cut" is adopted, it is important to optimize the root cut inclination angle θ. If the root cut inclination angle θ is too large, the balance between the portion located on the windward side with respect to the pitch axis 9 and the portion located on the leeward side is lost when the wind turbine blade 6 is bent due to a wind load, which rather results in increase of the pitch moment Mzb. Also, when the "pre-bend" is adopted, the balance between the portion located on the windward side with respect to the pitch axis 9 and the portion located on the leeward side in a case where the wind turbine blade 6 is bent depends on the degree of the "pre-bend". Accordingly, in order to determine the root cut inclination angle θ to be optimum, it is necessary to take into consideration of the pre-bend amounts at respective positions of the wind turbine blade 6 in the pitch axis direction (i.e., the positions of the center of mass of the blade in the x-axis direction at respective positions of the wind turbine blade 6 in the pitch axis direction for no load). The following discusses a technique for optimally designing the root cut inclination angle θ.

As described above, in order to reduce the pitch moment Mzb required for rotating the wind turbine blade 6 about the pitch axis 9, the balance between the portion of the wind turbine blade 6 located on the windward side with respect to the pitch axis 9 and the portion located on the leeward side is important. One technique for evaluating such a balance is to calculate an evaluation value based on an integral value f obtained by integrating a product of the position $x(z)$ of the center of mass of the wind turbine blade 6 with the wind load applied and the mass m(z) per unit length at each position of the wind turbine blade 6 in the z-axis direction from the blade root 6e to the blade tip end 6b of the wind turbine blade 6. The integral value f is expressed by the following Equation (1):

$$f = \int_{z_0}^{z_1} x(z) m(z) dz, \qquad (1)$$

where z is the position in the z-axis direction (in the direction along the pitch axis 9), $z_0$ is the position of the blade root 6e of the wind turbine blade 6 on the z-axis, and $z_1$ is a position of the blade tip end 6b of the wind turbine blade 6 on the z-axis.

In one embodiment, the integral value f per se may be used as the evaluation value. In this case, the evaluation value F is expressed by the following Equation (2):

$$F = \int_{z_0}^{z_1} x(z) m(z) dz. \qquad (2)$$

The evaluation value F is not necessarily the integral value f per se; the evaluation value F may be a value obtained by applying some calculation to the integral value f, or may be a value calculated in consideration of a parameter other than the integral value f.

In one embodiment, the position x(z) of the center of mass of the wind turbine blade 6 with the wind load applied may be calculated by the following Equation (3):

$$x(z) = \Delta x(z) - \Delta x_{PRE}(z) - z \sin \theta, \qquad (3)$$

where $\Delta x(z)$ is the displacement of the center of mass of the blade in the x-axis direction by the wind load, $\Delta x_{PRE}(z)$ is the pre-bend amount of the wind turbine blade 6 at the coordinate z, that is, the position of the center of mass of the wind turbine blade 6 in the x-axis direction at the coordinate z, and θ is the root cut inclination angle, that is, the angle defined between the extending direction of the wind turbine blade 6 at the blade root portion 6a and the center axis of the bearing 8.

In this case, Equation (4) is obtained as below from Equations (2) and (3):

$$F = \int_{z_0}^{z_1} (\Delta x(z) - \Delta x_{PRE}(z) - z \sin \theta) m(z) dz. \qquad (4)$$

In one embodiment, the evaluation value F may be obtained using Equation (4). Also, when z is 0 at the position of blade root 6e of the wind turbine blade 6 and z is R at the position of the blade tip end 6b (in the case where the blade length of the wind turbine blade 6 is R), Equation (5) is obtained as below:

$$F = \int_0^R (\Delta x(z) - \Delta x_{PRE}(z) - z \sin \theta) m(z) dz. \qquad (5)$$

In one embodiment, the evaluation value F may be obtained using Equation (5).

Herein, the position x(z) of the center of mass of the blade in a case when a wind load is applied (or the displacement $\Delta x(z)$ of the center of mass of the blade caused by the wind load) depends on the operation environment in which the wind turbine generator 1 is operated. As the operation environment, there are recited the air density, temperature and wind speed. It should be noted here that the air density and the temperature are fundamentally equivalent parameters, since the air density depends on the temperature. In one embodiment, the evaluation value F is calculated as a function that depends on the temperature T and the wind speed v. The balance between the pitch moments Mzb of the portion of the wind turbine blade 6 located on the windward side with respect to the pitch axis 9 and the portion located on the leeward side with respect to the pitch axis 9 can be evaluated for a desired temperature T and wind speed v, by calculating the position x(z) (or the displacement $\Delta x(z)$) for the desired temperature T and wind speed v, and further calculating the evaluation value F from the calculated position x(z) (or the displacement $\Delta x(z)$). Instead, the evaluation value F may be calculated as a function that depends on the air density ρ and the wind speed v. In this case, the balance between the pitch moments Mzb of the portion of the wind turbine blade 6 located on the windward side with respect to the pitch axis 9 and the portion located on the leeward side can be evaluated for the air density ρ and the wind speed v.

Herein, as described above, the pitch moment Mzb required for rotating the wind turbine blade 6 about the pitch axis 9 becomes maximum in the case where the temperature T is the lowest temperature $T_{LOW}$ at which the wind turbine generator 1 is allowed to be operated (or the air density ρ is the maximum air density $\rho_{MAX}$) and the wind speed is the rated wind speed $v_{RATED}$. Accordingly, the position x(z) of the center of mass of the blade (or the displacement $\Delta x(z)$) is calculated for the lowest temperature $T_{LOW}$ (or the maximum air density $\rho_{MAX}$) and the rated wind speed $v_{RATED}$ so that the evaluation value F calculated using the calculated position x(z) (or the displacement $\Delta x(z)$) is the most suitable value for evaluating the balance between the pitch moments Mzb by the self weighs of the portions of the A and B regions of the wind turbine blade 6. The pitch moment Mzb required for rotating the wind turbine blade 6 about the pitch axis 9 can be further reduced by determining the root cut inclination angle θ and the shape of the wind turbine blade (in particular, the pre-bend amount $\Delta x_{PRE}(z)$) so as to minimize the evaluation value F calculated with respect to the lowest temperature $T_{LOW}$ (or the maximum air density $\rho_{MAX}$) and the rated wind speed $v_{RATED}$.

Figure 10:
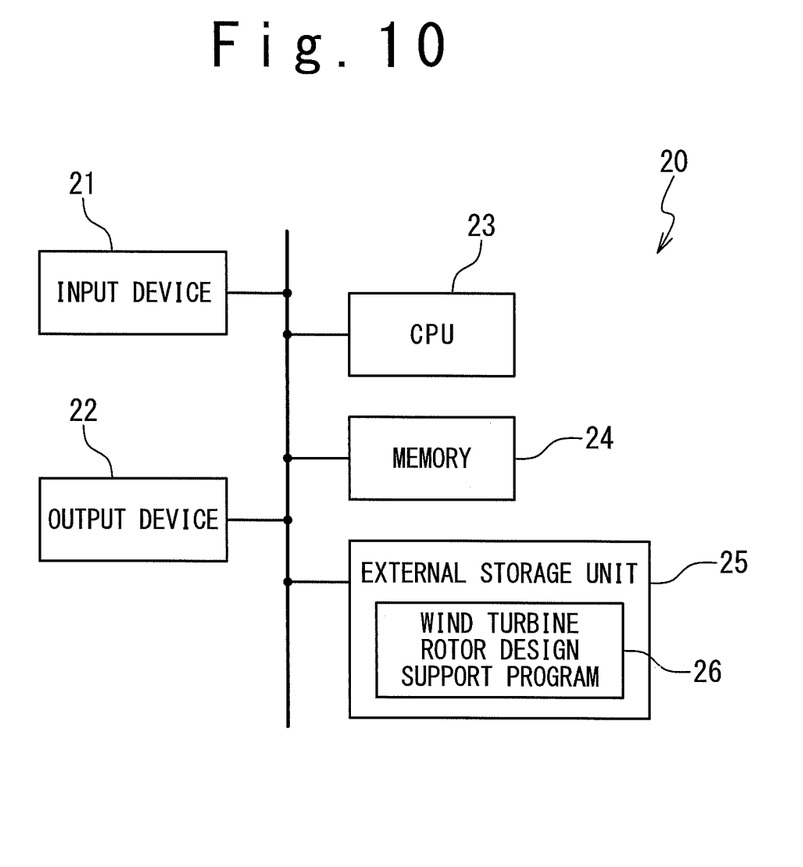
FIG. 10 is a block diagram showing the configuration of a wind turbine rotor design support apparatus in one embodiment.

The designing technique described above may be implemented using a wind turbine rotor design support apparatus 20 shown in FIG. 10. The wind turbine rotor design support apparatus 20 is configured as a computer that includes an input device 21, an output device 22, a CPU 23, a memory 24 and an external storage device 25. The input device 21 and the output device 22 configure a man-machine interface of the wind turbine rotor design support apparatus 20. The input device 21 is provided with a key board and a mouse, for example. The output device 22 is provided with a monitor and a printer for example. A wind turbine rotor design support program 26 is installed onto the external storage device 25. In one embodiment, a computer-readable recording medium recording the wind turbine rotor design support program 26 is used to install the same onto the external storage device 25. The wind turbine rotor design support program 26 is a computer program for aiding the above-described designing technique. The CPU 23 executes the wind turbine rotor design support program 26 using the memory 24. The wind turbine rotor design support program 26 includes: a simulator for calculating the position x(z) of the center of mass of the wind turbine blade 6 in the windward direction (x-axis direction) with a wind load applied for the desired operation environment (e.g., temperature T, air density ρ and wind speed v) or the displacement $\Delta x(z)$ due to the wind load; a code module for calculating the evaluation value F; and a structure design tool for designing the structure of the wind turbine blade 6.

A description is given below of a preferred example of the procedure of designing a wind turbine blade 6 using the wind turbine rotor design support apparatus 20 shown in FIG. 10. It should be noted that, in the following, a description is given of a case when the evaluation value F is calculated using Equation (5) from the lowest temperature $T_{LOW}$ and the rated wind speed $v_{RATED}$. It would be, however, obvious for the person skilled in the art that the evaluation value may be calculated in a similar procedure by using Equations (2) and (4) and that the maximum air density $\rho_{MAX}$ may be used instead of the lowest temperature $T_{LOW}$.

Design data of the wind turbine blade 6 is previously prepared in the external storage device 25. The design data include data indicative of the structure of the wind turbine blade 6 (the pre-bend amount $\Delta x_{PRE}(z)$ at the coordinate z of the wind turbine blade 6, the blade length R of the wind turbine blade 6 and the mass per unit length m(z) of the wind turbine blade 6 at the coordinate z and so on) and include data indicative of other mechanical characteristics. The design data may be produced using the structure design tool of the wind turbine rotor design support program 26 or externally given using the input device 21.

Moreover, the lowest temperature $T_{LOW}$ at which the wind turbine generator 1 is allowed to be operated and the rated wind speed $v_{RATED}$ are inputted via the input device 22 and stored onto the external storage device 25.

The wind turbine rotor design support program 26 calculates the displacement $\Delta x(z)$ of the center of mass of the blade in the windward direction (x-axis direction) due to the wind load using the simulator for the given lowest temperature $T_{LOW}$ and the rated wind speed $v_{RATED}$. The design data of the wind turbine blade 6 are used in the calculation of the displacement $\Delta x(z)$. The calculated displacement $\Delta x(z)$ of the center of mass of the blade in the windward direction (x-axis direction) due to the wind load is stored in the external storage device 25.

Further, the wind turbine rotor design support program 26 calculates the evaluation value F using Equation (5) mentioned above. This evaluation value F indicates a degree of the balance between the pitch moments Mzb of the portion of the wind turbine blade 6 located on the windward side with respect to the pitch axis 9 and the portion located on the leeward side with respect to the pitch axis 9. The pitch moment Mzb required for rotating the wind turbine blade 6 about the pitch axis 9 is reduced as the evaluation value F is reduced.

A user seeing the evaluation value F may revise the design data of the wind turbine blade 6 using the structure design tool of the wind turbine rotor design support program 26, if necessary. By revising the pre-bend amount $\Delta x_{PRE}(z)$ and/or the root cut inclination angle θ in accordance with the necessity, the evaluation value F can be reduced, that is, the pitch moment Mzb required for rotating the wind turbine blade 6 about the pitch axis 9 can be reduced. It should be noted here that, reduction of the evaluation value F is equivalent to reduction of the integral value f of Equation (1) in the calculation of the evaluation value F using Equation (5). The structure design tool of the wind turbine rotor design support program 26 may be used in revising the design data.

The designing procedure as described above allows designing the wind turbine blade 6 with a reduced pitch moment Mzb required for rotation about the pitch axis 9.

What is claimed is:

1. A designing method of a wind turbine rotor including a rotor head, a bearing provided on said rotor head and a wind turbine blade attached to said bearing, said method comprising:

providing operation environment data indicative of an operation environment of a wind turbine generator including said wind turbine rotor and design data of said wind turbine blade;

calculating a position of a center of mass of said wind turbine blade in each position in a lengthwise direction of said wind turbine blade in said operation environment from said operation environment data and said design data; and calculating an evaluation value which is a value depending on an integral value obtained by integrating a product of said calculated position of said center of mass of the blade and a mass per unit length at each position in a lengthwise direction of said wind turbine blade from a blade root of said wind turbine blade to a blade tip end of the same.

2. The designing method according to claim 1, wherein said operation environment data include first data indicative of a rated wind speed of said wind turbine generator and second data indicative of a lowest temperature at which said wind turbine generator is allowed to be operated or an air density corresponding to said lowest temperature.

3. The designing method according to claim 2, wherein said evaluation value F is calculated using the following Equation (1):

$$F=\int_{z_0}^{z_1} x(z)m(z)dz, \qquad (1)$$

wherein, in Equation (1), a z-axis is defined in a direction along a center axis of said bearing, and an x-axis is defined as being perpendicular to said z-axis so that a plane including said x-axis and said z-axis is perpendicular to a rotation plane of said wind turbine rotor, wherein F is said evaluation value, wherein x(z) is a position of the center of mass of said wind turbine blade in said x-axis direction in said the operation environment for a coordinate z on said z-axis, wherein m (z) is a mass per unit length of said wind turbine blade at the coordinate z on the z-axis, wherein $z_0$ is a position of said blade root on said z-axis, and wherein $z_1$ is a position of said blade tip end on said z-axis.

4. The designing method according to claim 3, wherein x(z) is calculated using the following Equation (2):

$$x(z)=\Delta x(z)-\Delta x_{PRE}(z)-z \sin θ, \qquad (2)$$

wherein $\Delta x(z)$ is a displacement of said center of mass of the blade in said x-axis direction due to a wind load, wherein the pre-bend amount $\Delta x_{PRE}(z)$ of said wind turbine blade is a position of said center of mass of said wind turbine blade in said x-axis direction with no load for the coordinate z, and wherein said root cut inclination angle θ is an angle between an extending direction of said wind turbine blade in said blade root portion and the center axis of said bearing.

5. The designing method according to claim 1, further comprising: revising said design data so as to reduce said integral value.

6. The designing method according to claim 4, wherein said blade root portion of said wind turbine blade is in a cylindrical shape, and wherein the extending direction of said wind turbine blade at said blade root portion is defined as a center line of said cylindrical shape.

7. A design support apparatus of a wind turbine rotor that includes a rotor head, a bearing provided on said rotor head and a wind turbine blade attached to said bearing, said apparatus comprising:

a storage device for storing operation environment data indicative of an operation environment of a wind turbine generator including said wind turbine rotor; and a processing unit, wherein said processing unit is programmed to calculate a position of a center of mass of said wind turbine blade at each position in a lengthwise direction of said wind turbine blade in said operation environment from said operation environment data and said design data, and to calculate an evaluation value which depends on an integral value obtained by integrating a product of the calculated position of said center of mass of the blade and a mass per unit length at each position in the lengthwise direction of said wind turbine blade from a blade root of said wind turbine blade to a blade tip end of the same.

8. A non-transitory tangible medium recording a computer design support program of a wind turbine rotor, the wind turbine rotor including a rotor head, a bearing provided on said rotor head and a wind turbine blade attached to said bearing, said program, when executed by a computer, causes the computer to perform:

calculating a position of a center of mass of said wind turbine blade at each position in a lengthwise direction of said wind turbine blade in an operation environment, based on operation environment data indicative of an operation environment of a wind turbine generator including said wind turbine rotor and design data of said wind turbine blade, wherein the operation environment data and the design data are prepared in a storage device; and calculating an evaluation value which depends on an integral value obtained by integrating a product of said calculated position of said center of mass of the blade and a mass per unit length at each position in the lengthwise direction of said wind turbine blade from a blade root of said wind turbine blade to a blade tip end of the same.

* * * * *